United States Patent [19]

Mahone

[11] Patent Number: 5,086,126
[45] Date of Patent: Feb. 4, 1992

[54] METHOD FOR PRODUCING FUNCTIONAL SILAZANE POLYMERS

[75] Inventor: Louis G. Mahone, Midland, Mich.

[73] Assignee: Dow Corning Corporation, Midland, Mich.

[21] Appl. No.: 632,833

[22] Filed: Dec. 24, 1990

[51] Int. Cl.$^5$ .............................................. C08G 77/26
[52] U.S. Cl. .................... 525/474; 525/477; 528/14; 528/38
[58] Field of Search ............. 525/474, 477; 528/18, 528/38, 14

[56] References Cited

U.S. PATENT DOCUMENTS

| | | | |
|---|---|---|---|
| 4,482,689 | 11/1984 | Haluska | 528/38 |
| 4,772,516 | 9/1988 | Mahone | 528/38 |
| 4,950,381 | 8/1990 | Takeuchi et al. | 528/10 |
| 4,952,670 | 8/1990 | Vaahs et al. | 528/38 |

Primary Examiner—John C. Bleutge
Assistant Examiner—Karen A. Hellender
Attorney, Agent, or Firm—Roger E. Gobrogge

[57] ABSTRACT

The present invention relates to a method of producing silazane polymers with silicon functional groups attached to the nitrogen. The method comprises treating a silazane polymer containing an N-H bond with an alkyllithium and then reacting the resultant silazane polymer with a chlorosilane. The invention also relates to novel silazane polymers produced by the above process as well as the use of these polymers to form ceramic materials.

11 Claims, No Drawings

METHOD FOR PRODUCING FUNCTIONAL SILAZANE POLYMERS

BACKGROUND OF THE INVENTION

The present invention relates to a method of producing silazane polymers with silicon functional groups attached to the nitrogen. The method comprises treating a silazane polymer containing an N-H bond with an alkyllithium to produce the lithium salt of the silazane polymer and then reacting this lithium salt of the silazane polymer with a chlorosilane. The invention also relates to novel silazane polymers produced by the above process as well as the use of these polymers to form ceramic materials.

It is known in the art that an alkyllithium can be used to replace the hydrogen atoms of various compounds (including compounds containing N-H bonds) with lithium atoms and that these lithium functional compounds may then be reacted so as to add functional groups onto the compound.

What has not been described, however, is the use of an alkyllithium to form functional silazane polymers. This was particularly unexpected since it was not known whether the functionalization would destroy the polymer during the process.

SUMMARY OF THE INVENTION

The present invention relates to a method of adding silicon functional groups on a silazane polymer containing N-H bonds. The method comprises treating the silazane polymer containing the N-H bonds with an alkyllithium to form a silazane polymer containing LiN bonds. The silazane polymer containing the LiN bonds is then reacted with a chlorosilane to form the silazane polymer with silicon functional groups added thereon.

The invention also relates to modified silazane polymers produced by the above process as well as their use in making ceramic materials.

DETAILED DESCRIPTION OF THE INVENTION

The present invention is based on the discovery that an alkyllithium (AlkylLi) can be used to add functional groups on silazane polymers. The method whereby said addition occurs can be described as follows:

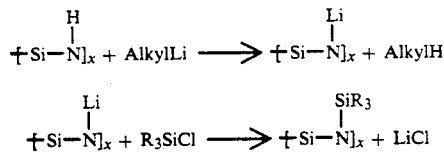

in which R is independently a hydrogen or a hydrocarbon group including, for example, alkyls such as methyl, ethyl, propyl, etc., alkenyls such as vinyl, allyl, hexenyl, etc., cyclic hydrocarbons such as cycloalkyls and cycloalkenyls, and aromatics such as phenyl. It is especially preferred that at least one of the R groups in the above formula is an unsaturated alkenyl since such a group makes the resultant functionalized polymer easily curable by the addition of a free radical.

The expression "functional polymer" is used herein to describe the resultant silazane polymers produced by equation II above wherein an N-H bond is replaced by a N-Si bond and the expression "silicon functional group" is used to describe the radical $-SiR_3$ as defined above.

The silazane polymers which are useful herein can be any which have at least 1 N-H bond per molecule. Generally, however, polymers with at least about 0.1% N-H are utilized. Preferably, the polymers used herein are non-cyclic silazanes. Specific non-limiting examples of such polymers include those of Gaul in U.S. Pat. No. 4,312,970, 4,395,460, and 4,340,619, those of Cannady in U.S. Pat. No. 4,540,803, those of Gerdau et al. in European Patent 351,747, those of U.S. Pat. No. 4,543,344, those of European Patent 332,374, and those of Lebrun et al. in U.S. Pat. Nos. 4,656,300 and 4,689,252, the disclosures of which are all hereby incorporated by reference. It is to be noted that some of these references describe silazane polymers with vinyl groups thereon. Such polymers, however, generally do not cure with free radicals as those described herein, apparently since the vinyl groups are not accessible.

The preferred polymers to be used herein are those of Gaul in U.S. Pat. No. 4,340,619 and those of Cannady in U.S. Pat. No. 4,540,803, brief descriptions of which will now be provided. The silazane polymers of Gaul are prepared by contacting and reacting in an inert, essentially anhydrous atmosphere a chlorine containing disilane or mixture of chlorine containing disilanes of the general formula:

$$(Cl_xR_ySi)_2$$

with a disilazane having the general formula:

$$(R_3'Si)_2NH$$

at a temperature in the range of 25° C. to 300° C. while distilling volatile byproducts, wherein R is vinyl, an alkyl group of 1-3 carbon atoms or a phenyl group;
R' is vinyl, hydrogen an alkyl group of 1-3 carbon atoms or a phenyl group;
x has a value of 0.5-3;
y has a value of 0-2.5 and the sum of a+b equals 3.

The chlorine containing disilanes of Gaul have the general formula $(Cl_xR_ySi)_2$ where R is vinyl, an alkyl group of 1-3 carbon atoms or a phenyl group. Thus, the R groups are independently selected from the group consisting of methyl, ethyl, propyl, vinyl and phenyl. Examples of these chlorine containing disilanes include $[Cl(CH_3)_2Si]_2$, $[Cl_2CH_3Si]_2$, $[Cl_2C_2H_5Si]_2$, $[Cl(C_6H_5)_2Si]_2$, $[Cl_2CH_2=CHSi]_2$, $Cl(CH_3)_2SiSi(CH_3)Cl_2$, and $Cl(C_6H_5)_2SiSi(CH_3)_2Cl$.

Monosilanes may also be used in admixture with the above described chlorine containing disilanes. Examples of such monosilanes include $CH_3SiCl_3$, $H(CH_3)_2SiCl$, $(CH_3)_2SiCl_2$, $(CH_3)_3SiCl$, $(C_2=CH)(CH_3)_2SiCl$, $(C_2H_5)_2SiCl_2$, $C_6H_5SiCl_3$ as well as $(C_6H_5)_2SiCl_2$ and $(C_6H_5)_2SiCl$.

The disilazane used in the Gaul invention has the formula $(R_3'Si)_2NH$, where $R_1$ is vinyl, hydrogen, an alkyl group of 1-3 carbon atoms or a phenyl group. Thus, the R' groups are independently selected from the group consisting of hydrogen, methyl, ethyl, propyl, vinyl and phenyl. Examples of suitable disilazanes include $[(CH_3)_3Si]_2NH$, $[C_6H_5(CH_3)_2Si]_2NH$, $[(C_6H_5)_2CH_3Si]_2NH$, $[C_2=CH(CH_3)_2Si]_2NH$, $[CH_2=CH(CH_3)C_6H_5Si]_2NH$, $[CH_2=CH(C_6H_5)_2Si]2NH$, $[CH_2=CH(C_2H_5)_2Si]_2NH$, $[H(CH_3)_2Si]_2NH$, and $[CH_2=CH(C_6H_5(C_2H_5Si]_2NH$.

An especially preferred embodiment of the Gaul invention involves the reaction of methylchlorodisilanes with hexamethyldisilazane. The resultant polymer produced thereby, methylpolydisilylazane, has been shown to have valuable preceramic properties.

The above reactants are brought together in an inert, essentially anhydrous atmosphere. By inert it is meant that the reaction is carried out under a blanket of inert gas such as argon, nitrogen or helium. What is meant by essentially anhydrous is that the reaction is preferably carried out in an absolutely anhydrous atmosphere but minute amounts of moisture can be tolerated.

When the reactants are contacted with each other an intermediate amino compound is formed. Upon continued heating R3SiCl is distilled from the reaction mixture and the silazane polymer formed. As the temperature of the reaction is raised, more condensation takes place and crosslinking occurs. This control allows one to stop the reaction at any point to obtain almost any desired viscosity. The desired temperature range for the reaction is 25° C. to 300° C. with a temperature in the range of 125° C. to 300° C. being more preferred. The length of time that the reaction requires depends on the temperature employed and the viscosity one wishes to achieve.

The above described disilazane polymers of Gaul may have a relatively high chloride ion content and it is preferred that such concentration be lowered before use in the present invention. A method for such removal is described in U.S. Pat. No. 4,772,516 granted to Mahone, which is hereby incorporated by reference. The method described therein comprises treating the polymer with ammonia for a time sufficient to remove the chlorine.

The silazane polymers of Cannady are prepared by a method which comprises contacting and reacting in an inert essentially anhydrous atmosphere, trichlorosilane with a disilazane at a temperature in the range of 25° C. to 300° C. while distilling volatile byproducts. The disilazane used in the process has the formula $(R_3Si)_2NH$ where R is selected from the group consisting of vinyl, hydrogen, phenyl and alkyl radicals containing 1 to 3 carbon atoms.

The trichlorosilane is treated with the disilazane in sufficient amounts to react with all of the chlorine in the chlorine containing silane. This is usually an equimolar amount based on the chlorine content of the trichlorosilane.

The disilazane used in the Cannady invention has the formula $(R_3'Si)_2NH$, where R' is vinyl, hydrogen, an alkyl group of 1-3 carbon atoms or a phenyl group. Thus, the R' groups are independently selected from the group consisting of hydrogen, methyl, ethyl, propyl, vinyl and phenyl. Examples of suitable disilazanes include $[(CH_3)_3Si]_2NH$, $[C_6H_5(CH_3)_2Si]_2NH$, $[(C_6H_5)_2CH_3Si]_2NH$, $[C_2=CH(CH_3)_2Si]_2NH$, $[CH_2=CH(CH_3)C_6H_5Si]_2NH$, $[CH_2=CH(C_6H_5)_2Si]_2NH$, $[CH_2=CH(C_6H_5)_2Si]_2NH$, $[H(CH_3)_2Si]_2NH$, and $[CH_2=CH(C_6H_5)C_2H_5Si]_2NH$.

An especially preferred embodiment of the Cannady invention involves the reaction of trichlorosilane with hexamethyldisilazane. The resultant polymer produced thereby, hydridopolysilazane, has been shown to have valuable preceramic properties.

The above reactants are brought together in an inert, essentially anhydrous atmosphere. By inert it is meant that the reaction is carried out under a blanket of inert gas such as argon, nitrogen or helium. What is meant by essentially anhydrous is that the reaction is preferably carried out in an absolutely anhydrous atmosphere but minute amounts of moisture can be tolerated.

When the reactants are contacted with each other an intermediate amino compound is formed. It is preferred that the reactants are brought together in such a manner to keep the initial reaction exotherm to a minimum. Upon continued heating additional amino compound is formed and, with further heating, R3SiCl is distilled from the reaction mixture and the silazane polymer formed. For best results, the rate of heating should be controlled at a rate of less than about 1° C./min. A heating rate of about 0.5° C./min. or less is preferred. As the temperature of reaction is raised, more condensation takes place and crosslinking occurs with residual R3Si that is not distilled from the mixture acting as a chain stopper. This control allows one to stop the reaction at any point to obtain almost any desired viscosity. The desired temperature range for the reaction is 25° C. to 300° C. with a temperature in the range of 125° C. to 275° C. being more preferred. The length of time that the reaction requires depends on the temperature employed and the viscosity one wishes to achieve.

As stated above, the polymers used in this invention may be those formed by the above processes or they may be any silazane with sufficient N-H bonds. Generally, the polymer is dissolved in a solvent to effectuate the following reactions. The solvents which may be used herein include any which act as a solvent for both the initial polymer and the functionalized derivative and which do not cause rearrangement of either species. Examples of such solvents include alkanes such as pentane, hexane, heptane, octane etc., ethers such as tetrahydrofuran, or aromatic hydrocarbons such as benzene, toluene, xylene etc.

The above polymer is then reacted with the alkyllithium to convert the N-H bonds to N-Li by merely mixing the alkyllithium in a solution of the polymer. This reaction can be performed at any suitable temperature or pressure and in any convenient atmosphere. For simplicity, however, it is generally run at room temperature in air at atmospheric pressure by agitating the two agents in a suitable reaction vessel.

The alkyllithiums used herein are well known in the art and readily available commercially. Examples of such compounds include methyllithium, ethyllithium, propyllithium and butyllithium with butyllithium being especially prefered herein. These agents are used in amounts sufficient to react with either all or a portion of the N-H bonds on the polymer depending on the polymer itself and the degree of functionalization desired. Hence, for example, amounts of greater than about 0.01 mole AlkylLi per N-H bond may be used. The use of excess AlkylLi is often preferred since said excess often promotes the subsequent reaction of the polymeric salt with the chlorosilane.

Though the alkyllithiums are the only agents specifically mentioned herein, it is also contemplated that other equivalent bases (bases which are stronger than the N-H bond but which do not cause rearrangement of the polymer) may be used.

The lithium salt of the silazane polymer obtained by reaction of the silazane polymer with an alkyllithium is then reacted with a chlorosilane to replace the lithium atom with a silane functional group. Generally, this reaction is conducted by merely adding the chlorosilane to the solution of the polymeric salt. Additional measures such as agitation, heat or refluxing may be used to assist in increasing the rate and extent of reaction.

The above reaction of the lithium salt with the chlorosilane is greatly accelerated in the presence of certain solvents. Such solvents include, for example, ethers and, of the ethers, tetrahydrofuran (THF) is particularly preferred. This solvent may either be added to the reaction mixture prior to the AlkylLi reaction (as the sole solvent for this reaction, for instance) or, if the polymer is dissolved in a different solvent for its reaction with alkyllithium, it may be added to the solution of the polymeric salt prior to its reaction with the chlorosilane. Generally, the amount of such a solvent can vary over a wide range of from about 1 part THF per 10 parts polymer to about 10 parts THF per 1 part polymer. It is to be noted that the use of such solvents may also serve to enhance the solubility of certain polymeric lithium salts. In addition, it is also to be noted that alternative solvents may be necessary if bases other than alkyllithiums are used.

The chlorosilanes which are functional herein have the general formula $R_aSiCl_b$ in which each R is independently hydrogen or a hydrocarbon group, a is 2 or 3, b is 1 or 2 and a+b equals 4. Suitable hydrocarbon groups can include, for example, alkyls such as methyl, ethyl, propyl, etc., alkenyls such as vinyl, allyl, hexenyl, etc., cyclic hydrocarbons such as cycloalkyls and cycloalkenyls, and aromatics such as phenyl. It is especially preferred that at least one of the R groups in the above formula is an unsaturated alkenyl since such a group makes the resultant functionalized polymer easily curable by a method such as the addition of a free radical precursor and subsequent heating. Such curable polymers are of significant value in the formation of ceramics.

The above chlorosilane is generally used in an amount at least sufficient to replace the N-Li bonds with N-Si bonds. Therefore amounts in the range of at least about 0.5 mole silane per N-Li bond for dichlorosilanes and at least about 1 mole silane per N-Li bond for monochlorosilanes are generally used.

The functionalized polymer produced by the above reaction is then merely recovered from the solution. It is preferable, however, that the solution be neutralized prior to said recovery, especially when excess alkyllithium was used. Acids such as ammonium chloride or acetic acid may generally be used for such neutralization.

The method of polymer recovery is not critical and can be by any convenient means. Methods such as simple evaporation or stripping under heat and/or vacuum are known in the art and useful herein.

The functionalized polymers formed by the above process are essentially identical to the precursor polymers except for the silicon functional group on the nitrogen. This results in functionalized polymers with nearly the same polymeric characteristics (molecular weight, Tg, solubility, etc.) as the precursor polymers with the added advantages that the functional group provides (e.g., curability when a vinyl or other such group is present).

As noted supra, the methods of this invention are especially valuable for adding unsaturated alkenyl groups (such as vinyl) on the polymers such that they are easily curable. Such curability is critical for deep section curing in applications such as ceramic matrix composites and, as such, the polymers have found particular utility in these areas. The method of curing such polymers generally involves the addition of free radical precursors followed by heating. The free radical precursors which may be used herein are well known in the art and include a variety of peroxides such as diaroyl, dialkyl, diaralkyl, alkyl aryl, alkyl aroyl, and alkyl acyl which, when heated, result in the production of the free radical. Examples of specific free radical precursors include dibenzoyl peroxide, bis-2,4-dichlorobenzoyl peroxide, di-t-butyl peroxide, dicumyl peroxide, etc.

The functionalized polymers formed in the above manner are useful for manufacturing ceramics. The process for converting such polymers to ceramics comprises merely pyrolyzing them in an inert atmosphere or in a vacuum at a temperature of at least about 750° C. to give a silicon carbide containing material. The polymer may also be shaped and cured prior to pyrolysis to form various objects including, for example, fibers. In addition, the polymers may be filled with conventional ceramic type fillers such as SiC or $Si_3N_4$ to form ceramic objects or they may be used as the matrix for ceramic composites.

The following non-limiting examples are provided so that one skilled in the art may more readily understand the invention.

EXAMPLE 1

A phenyl vinyl methylpolydisilylazane polymer was prepared by the method of Gaul in U.S. Pat. No. 4,340,619 in which 28 pounds of methylchlorodisilane, 4.8 pounds of phenylvinyldichlorosilane and 52 pounds of hexamethyldisilzane were reacted at 230° C. over 3.8 hours. The resultant polymer (Tg 108° C.) was diluted to 28% solids in heptane and treated with ammonia at 90 psi for about 12 hours. The polymeric solution was filtered to yield a chlorine free polymer. This solution was treated with 1.67 mmole BuLi per gram of polymer to produce an insoluble polymer. Tetrahydrofuran was added to the solution to dissolve the polymer. The resultant solution contained 18 weight percent polymer, 27 weight percent THF and 55 weight percent heptane.

Portions of this solution were treated with a variety of silanes to show their reactivity with the lithium salt of the polymer. The following table summarizes the results:

| ID # | Amt Polymer (mmole) | Silane Agent | mmole | Comment |
|---|---|---|---|---|
| 1 | 6.0 | Me2ViSiCl | 4.1 | precipitate in 10 minutes |
| 2 | 6.0 | PhMeViSiCl | 4.1 | precipitate in 10 minutes |
| 3 | 6.0 | MeHSiCl | 1.0 | 0.3 ml gas produced |
| 4 | 1.5 | Me2HSiCl | 1.0 | 0.2 ml gas produced |
| 5 | 1.5 | (HMe2Si)20 | 1.0 | 0.15 ml gas produced |
| 6 | 3.0 | Me2SiC12 | 3.0 | salt formed over 3 minutes |
| 7 | 3.0 | MeHSiC12 | 3.0 | fast reaction with heat |
| 8 | 3.0 | Me2SiC12 | 1.5 | Salt formed over 3 minutes |
| 9 | 3.0 | MeHSiC12 | 1.5 | fast reaction with heat |

EXAMPLE 2

To a sample of the chlorine-free polymer of Example 1 comprising 18 g polymer and 46.2 g heptane was added 26 g of tetrahydrofuran and 11.5 mL of 2.6M BuLi (30 mmole) in hexane to produce a soluble polymer. This solution was treated with 18 mmole Me2HSiCl to yield immediate heat and solids. The sample was centrifuged to remove solids. The molar IR absorption of a cast film showed $A_{2110}/A_{1250}$ (SiH/SiMe)=0.108 which is near the theoretical value of 0.070. The polymer solution was stripped to yield a solid having a Tg of 103° C.

EXAMPLE 3

To a sample of the chlorine-free polymer of Example 1 comprising 84 g polymer in 216 g heptane was added 140 ml of THF and 80.8 ml of 2.6M BuLi (210 mmole) in hexane to produce a soluble polymer. The solution was treated with 210 mmole Me$_2$HSiCl and then heated under reflux for 4 hours. The mixture was cooled and 20 g of ammonium chloride added. The mix was stripped to remove THF and hexane. The mixture was filtered and stripped at 190° C. and 5 torr to produce a polymer with a Tg of 133° C. The NMR group ratios were SiMe 1.00, SiPh 0.050, and SiVi 0.130.

EXAMPLE 4

380 g of a hydridopolysilazane polymer prepared by the method of Cannady in U.S. Pat. No. 4,540,803 (Mw 12.696; Mn 2898; Tg 119° C.) was diluted in 572 g xylene. The above solution was charged into a stirred 3 neck flask fitted with a stirrer and stripping head. To this solution was added 100 g THF and 88ml of BuLi (0.15M in hexane) with stirring. 21.4 g of 5-hexenyldimethylchlorosilane was then added over 5 minutes. The solution turned cloudy and was allowed to stand for 30 minutes. 5.3 g of ammonium chloride was then added and the mixture was stirred for 2 hours. The mixture was stripped at 100° C. cooled and filtered. The product had a Mw of 11,604, Mn of 2749, Tg of 110° C. and contained 0.8 wt % vinyl.

It was then attempted to cure 3 portions of the vinyl containing polymer by adding 0. 2.5 and 7 percent bis(t-butyl peroxy-2.5-dimethylhexane) and heating to 200° C. in nitrogen for 2 hours. The portions of the polymer containing the peroxide cured (as judged by toluene solubility) whereas the portion without peroxide did not cure. Upon pyrolysis to 1200° C. in argon, the cured samples provided char yields as follows: 2.5% peroxide - 59.5% char yield and 7% peroxide - 63.8% char yield.

EXAMPLE 5

380 g of a hydridopolysilazane polymer prepared by the method of Cannady in U.S. Pat. No. 4,540,803 (Mw 12,696; Mn 2898; Tg 119° C.) was diluted in 572 g xylene. This solution was stripped to a pot temperature of 250° C. at 100 torr to remove the xylene. On cooling, 572 g of toluene and 175 mL of BuLi (1.7M in hexane) was added with stirring to yield a clear solution. 100 g of THF was added to this solution.

Portions of the above solution were treated with the silanes listed in the following table. The resultant polymers were neutralized with ammonium chloride and acetic acid. The Mw and Mn of these polymers are set forth in the table.

| Amt Polymer (ml) | Amt Silane (mEq) | Silane | Mw | Mn |
|---|---|---|---|---|
| 7.5 | 2 | Me2SiCl2 | 12.702 | 3115 |
| 7.5 | 2 | MeHSiCl2 | 15.263 | 3384 |
| 7.5 | 1.8 | | 13,798 | 3599 |
| 7.5 | 1.0 | PhMeViSiCl | 12,455 | 2764 |
| remainder | 30.9 g | ViMe2SiCl | 12,122 | 2803 |

That which is claimed is:

1. A method of adding silicon functional groups on a silazane polymer containing N-H bonds comprising:
    treating the silazane polymer containing the N-H bonds with an alkyllithium to form a silazane polymer containing LiN bonds; and
    reacting the silazane polymer containing Li-N bonds with a chlorosilane to form a silazane polymer with silicon functional groups.

2. The method of claim 1 wherein the alkyllithium is butyllithium.

3. The method of claim 2 wherein the treating and reacting are performed in a solvent.

4. The method of claim 3 wherein the solvent is an ether.

5. The method of claim 4 wherein the ether is tetrahydrofuran.

6. The method of claim 1 wherein the silazane polymer is selected from the group consisting of hydridopolysilazane and methylpolydisilylazane.

7. The method of claim 5 wherein the silazane polymer is selected from the group consisting of hydridopolysilazane and methylpolydisilylazane.

8. The method of claim 1 wherein the chlorosilane has the formula $R_aSiCl_b$ in which each R is independently hydrogen or a hydrocarbon group, a is 2 or 3, b is 1 or 2 and a+b equals 4.

9. The method of claim 8 wherein at least one of the R groups is a hydrocarbon group of the formula —(CH$_2$)$_x$CHCH$_2$, wherein x=0-32.

10. The method of claim 7 wherein the chlorosilane has the formula $R_aSiCl_b$ in which each R is independently hydrogen or a hydrocarbon group, a is 2 or 3, b is 1 or 2 and a+b equals 4.

11. The method of claim 10 wherein at least one of the R groups is a hydrocarbon group of the formula —(CH$_2$)$_x$CHCH$_2$, wherein x=0-32.

* * * * *